April 17, 1934.   A. KESSLER   1,955,073
COMBINED SUPPORTING AND SECURING DEVICE
Filed June 29, 1933
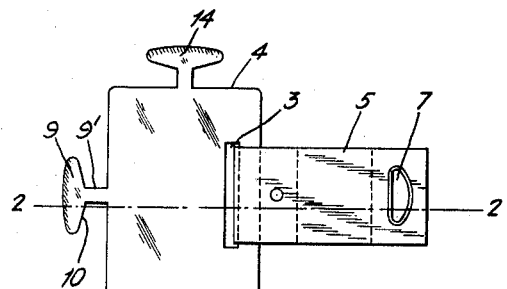
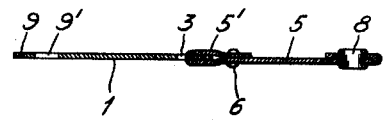
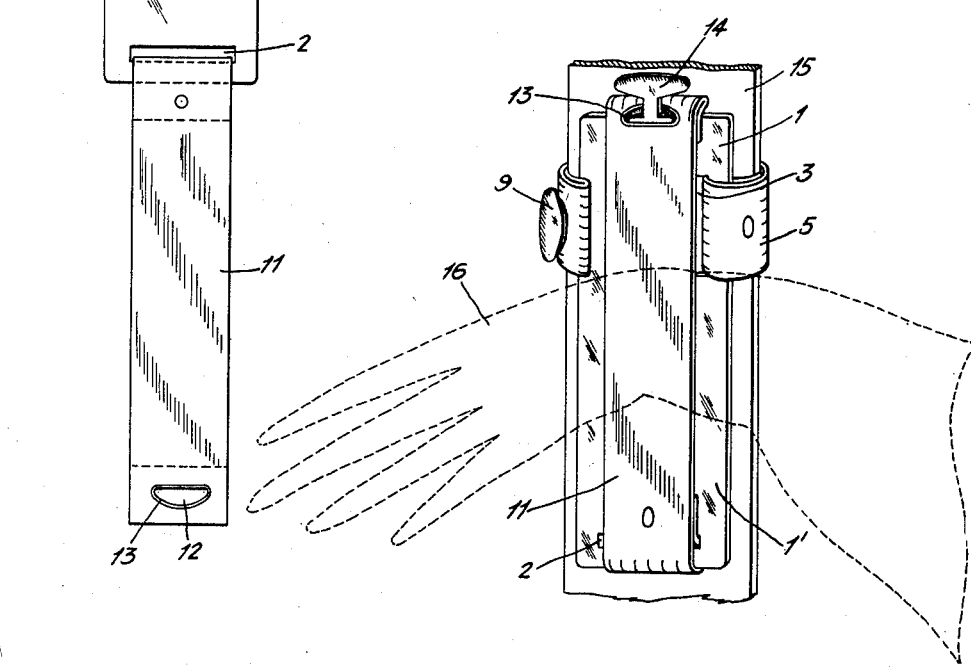
INVENTOR
AUGUSTA KESSLER
BY
ATTORNEY Patented Apr. 17, 1934

1,955,073

UNITED STATES PATENT OFFICE 1,955,073

COMBINED SUPPORTING AND SECURING DEVICE

Augusta Kessler, Brooklyn, N. Y.

Application June 29, 1933, Serial No. 678,145

1 Claim. (Cl. 24—73)

My present invention relates to article holders generally, and more particularly to a novel and improved type of device for securing a desired article to the device.

There are many instances where it is desired to permanently, or temporarily, affix an article to another one. For example, in carrying a handbag, a woman often desires to temporarily keep her handkerchief or gloves attached to the carrying handle of the hand-bag. As hand-bags are now constructed it is very easy to lose the handkerchief or gloves, the latter often slipping out of the position between the body of the hand-bag and the carrying handle.

There are many other situations where it is desired to temporarily position some article of wear.

It is one of the main objects of my present invention to provide a combined supporting and securing device which will function to positively and simply hold an article of wear, for example, in a safe and convenient position, and yet be adapted for ready attachment to any desired device.

It may also be stated that it is another important object of my invention to provide as a new article of manufacture a substantially rigid article support plate, which plate may be mechanically coupled in a simple and efficient manner to some desired device, and which plate also includes a securing means, such as an elastic strap where desired, which functions to positively maintain in a readily removable manner any desired article, such as a pair of gloves, a handkerchief, or any other desired piece of wearing apparel which is normally desired to be kept in a temporary position until further use.

Another object of the present invention is to provide as a new article of manufacture, a plate, an elastic strip, said elastic strip being affixed to said plate on one side thereof, the strip being provided with an eyelet, the plate furthermore being provided with a hook element around which the eyelet is adapted to be slid and secured, there also being a second strip of resilient, or elastic, material affixed to one extremity of the plate, a second hook element being provided on the plate in alignment with the second strip whereby the eyelet at the free end of the second strip is adapted to be secured to the second hook.

And still other objects of the present invention are to improve generally the simplicity and efficiency of combined supporting and securing devices, and to particularly provide a combined device of this type which is not only durable and reliable in operation, but economically manufactured.

The novel features which I believe to be characteristic of my invention are set forth in particularity in the appended claim, the invention itself, however, as to both its structure and mode of use will best be understood by reference to the following description taken in connection with the drawing, in which I have indicated one arrangement whereby my invention may be carried into effect.

In the drawing,

Fig. 1 shows a plan view of the combined supporting and securing device in non-operative position, Fig. 2 is a section taken along line 2—2 in Fig. 1, Fig. 3 is an isometric view of the device shown in Fig. 1 in operative position.

Referring now to the accompanying drawing wherein like reference characters in the different figures represent similar elements, the combined supporting and securing device of my present invention comprises a plate 1 of substantially rectangular configuration. The plate is of a substantially small thickness in proportion to its area, and it is provided at one extremity thereof with a substantially rectangular slot, or opening, 2. A second opening 3, similar to the opening 2, is provided adjacent one long edge of the plate 1, and substantially mid-way between the extremity 4 of the plate and a median line through the plate 1.

The plate 1 is preferably composed of a metal, and has substantially rounded corners, but it is to be clearly understood that it may, if desired, be composed of a flexible material such as celluloid. The plate 1 may also be composed of a phenol condensation product, a hard rubber composition or any other material which will impart sufficient rigidity to the plate so that it can be readily used for its desired purpose. Of course, the invention is not limited to a plate of substantially rectangular form, for the plate may have any other desired configuration, such as an ellipse, a circle and the like.

To secure the plate 1 to a supporting device, there is provided a strap, strip, or band, of material 5 which is secured at one end thereof to the edge of the plate 1 adjacent the slot 3. The attachment to the plate is made, as clearly shown in Fig. 2, by looping one end 5' of the strap 5 through the opening 3, and employing a securing means, as a rivet 6, to secure the free end of the loop 5' to the strap 5. The unattached end of the strap 5 is provided with an eyelet 7.

As shown in Fig. 2 the eyelet 7 consists of a grommet 8 which functions to staple together the free end of strap 5 which has been bent over upon itself. The eyelet 7 preferably has a configuration such as a semi-ellipse, but it is to be clearly understood that any other shape may be employed, depending upon the configuration of the hook element 9. The latter element 9 is disposed in alignment with the eyelet 7, and is preferably formed integral with plate 1. As shown in Fig. 1 the hook element 9 has a substantially T-shaped configuration, the neck 9' of the hook element 9 extending out from the body of the plate 1.

The head of the hook element 9 is provided with inner edges 10 which slope away from the long edge of the plate 1 adjacent the hook element 9. This is formed in this manner so that the eyelet 7 may readily be slid over the over-hanging edges of the hook element 9. In order to secure an article to the plate 1, there is provided a strap, strip or band 11, which is preferably composed of a material similar to that used for making the strap 5, although it is to be clearly understood that this need not necessarily be the case. One end of strap 11 is affixed to the extremity of plate 1 adjacent the slot 2 in a manner shown in connection with the strap 5, while the free end of the strap 11 is provided with an eyelet 12 which is constructed as the eyelet 7, a grommet 13 being utilized in this case. The hook element 14, in this case, is provided in alignment with the eyelet 12, and projects from the extremity 4.

The hook element 14 is constructed in a manner similar to the hook element 9, and it is preferred that the dimensions of the hook elements 9 and 14 be similar, and that the dimensions of the eyelets 12 and 7 also be the same. Although I have referred to the straps 5 and 11 as being composed of an elastic and resilient material, it is to be clearly understood that I do not limit the invention to any particular materials. The conventional and well known type of elastic fabric may be utilized for these straps. If desired, the straps 5 and 11 may be composed of rubber, leather, silk, textile fabrics in general. The straps may also be composed of expanded metal.

The mode of operation and usage of the present device should be obvious from the aforegoing description and accompanying drawing. In Fig. 3 is shown the combined supporting and securing device in operative position. In this figure the numeral 15 designates any device to which it is desired to affix, or attach, the plate 1. Assuming that the device 15 is the carrying handle of a woman's hand-bag, it will be observed that the strap 5 is wrapped around the rear of the handle 15, and the eyelet 7 slid over the hook element 9, the hook element functioning to positively retain the strap 5 in its attached position. An article which is desired to temporarily position against the plate 1 is then disposed upon the exposed face 1' of the plate 1, and the strap 11 brought over the article 16, and the eyelet 13 slid over the hook element 14. The hook element 14 thus functions to positively maintain the article 16 in position against the plate 1, and, where the strap 11 is resilient, functions to keep the article 16 in position in a manner such that it is extremely difficult to lose the article 16.

As shown in Fig. 3 the article 16, represented by dotted lines for the sake of emphasis, is a pair of woman's gloves, but it is to be clearly understood that the article 16 may be a handkerchief, a soft collapsible or foldable hat, veil, beach accessories, or even stationery appliances. Of course, it is to be clearly understood that the device 15 is not restricted to the carrying handle of a hand-bag, since it may be a cylindrical object, such as a clothes line, a bed-post, the wrist of a person, the trouser supporting belt of a man, and the like.

The element 1 can be, for example, cylindrical in configuration and it is also to be understood that the particular hook element and eyelet securing means may be replaced by snap fastener devices or similar attaching expedients. Furthermore, the strap 5 may be replaced by a means, such as a rivet, for attaching the plate 1 directly to the device 15 so that the plate 1 cannot be removed therefrom.

It is also to be clearly understood that the present invention is not limited to the use of only two transverse straps, but that one or more additional straps may be employed in parallel arrangement with the straps as shown in Fig. 1, depending upon the usage of the present invention. Additionally, the functions of the straps 11 and 5 may be reversed, and the strap 11 be used to secure the plate 1 to a supporting device and the strap 5 be employed for supporting an article on the plate. Additionally, the strap 5 and hook element 9 may be positioned mid-way between the strap 11 and the hook element 14.

While I have indicated and described one construction for carrying my invention into effect, it will be apparent to one skilled in the art that my invention is by no means limited to the particular structure shown and described, but that many modifications may be made without departing from the scope of my invention as set forth in the appended claim.

What I claim is:

An article holder device adapted to be secured to the carrying loop of a hand bag, said device comprising a substantially rectangular plate of sufficient rigidity to maintain its shape upon the application of bending forces, a strip of elastic material affixed at one end to an intermediate point on one edge of the plate, the other end of said strip being provided with an eyelet, the opposite edge of said plate being provided with a hook to which the eyelet end of said strip is adapted to be secured when one face of the said plate is in contact with said carrying loop and said strip is wrapped around the latter to rigidly position said plate in said contacting manner, a second strip of elastic material affixed at one end to a third edge of the said plate, the free end of said second strip being provided with an eyelet, the fourth edge of the plate having a hook to which the eyelet end of the second strip is adapted to be secured when a pliable, non-rigid article, such as a pair of gloves, is positioned against the opposite face of said plate and said second strip is snugly positioned across the article to securely maintain it in safe position on said plate.

AUGUSTA KESSLER.